United States Patent
Altman et al.

(10) Patent No.: US 8,184,504 B2
(45) Date of Patent: May 22, 2012

(54) SYSTEM AND METHOD FOR POSITIONING

(75) Inventors: Nathan Altman, RaAnana (IL); Meir Agassy, Ramat-Gan (IL)

(73) Assignee: EPOS Development Ltd., Hod-HaSharon (IL)

( * ) Notice: Subject to any disclaimer, the term of this patent is extended or adjusted under 35 U.S.C. 154(b) by 299 days.

(21) Appl. No.: 12/532,862

(22) PCT Filed: Mar. 27, 2008

(86) PCT No.: PCT/IL2008/000432
§ 371 (c)(1),
(2), (4) Date: Sep. 24, 2009

(87) PCT Pub. No.: WO2008/117292
PCT Pub. Date: Oct. 2, 2008

(65) Prior Publication Data
US 2010/0085838 A1    Apr. 8, 2010

Related U.S. Application Data

(60) Provisional application No. 60/907,280, filed on Mar. 27, 2007.

(51) Int. Cl.
*G01S 3/80* (2006.01)
*G01S 1/00* (2006.01)

(52) U.S. Cl. ........................................................ 367/124

(58) Field of Classification Search .................. 367/124, 367/128
See application file for complete search history.

(56) References Cited

U.S. PATENT DOCUMENTS

| | | | |
|---|---|---|---|
| 3,526,895 | A | 9/1970 | Guyon de Montlivault et al. |
| 3,848,254 | A | 11/1974 | Drebinger et al. |
| 5,365,516 | A | 11/1994 | Jandrell |
| 7,026,992 | B1 | 4/2006 | Hunt et al. |
| 2005/0150697 | A1 | 7/2005 | Altman et al. |
| 2010/0085838 | A1* | 4/2010 | Altman et al. ............... 367/124 |

FOREIGN PATENT DOCUMENTS

| | | |
|---|---|---|
| CA | 2681589 | * 10/2008 |
| DE | 2525446 | 12/1976 |
| DE | 19712751 | 10/1998 |
| DE | 19842712 | 5/2000 |
| EP | 0006594 | 1/1980 |
| EP | 1345465 | 9/2003 |
| GB | 2408337 | 5/2005 |
| WO | WO 00/28348 | 5/2000 |
| WO | WO 00/65530 | 11/2000 |

(Continued)

OTHER PUBLICATIONS

Examiner's Report Dated Nov. 30, 2010 From the Austrlaian Government, IP Australia Re. Application No. 2008231407.

(Continued)

*Primary Examiner* — Daniel Pihulic

(57) ABSTRACT

A system for small space positioning comprises a transmitting device, movable within an approximate range, configured for transmitting a modulated continuous wave, wherein the modulated continuous wave includes a carrier signal and a base-band signal, and a receiving unit configured for receiving signal (s) transmitted by the transmitting device and for determining a position of the transmitting device within the approximate range based on analysis of both the carrier signal and the base-band signal received from the transmitting device.

47 Claims, 7 Drawing Sheets

FOREIGN PATENT DOCUMENTS

| WO | WO 01/59992 | 8/2001 |
|---|---|---|
| WO | WO 02/39139 | 5/2002 |
| WO | WO 2004/048998 | 6/2004 |
| WO | WO 2008/117292 | 10/2008 |

OTHER PUBLICATIONS

Response Dated Jan. 31, 2011 to Communication Pursuant to Article 94(3) EPC of Nov. 3, 2010 From the European Patent Office Re. Application No. 08720055.6.
Communication Pursuant to Article 94(3) EPC Dated Jun. 17, 2011 From the European Patent Office Re. Application No. 08720055.6.
Examination Report Dated Mar. 31, 2011 From the Intellectual Property Office of New Zealand Re. Application No. 580664.
Response Dated Sep. 26, 2011 to Examination Report of Mar. 31, 2011 From the Intellectual Property Office of New Zealand Re. Application No. 580664.
Communication Pursuant to Article 94(3) EPC Dated Nov. 3, 2010 From the European Patent Office Re. Application No. 08720055.6.
Communication Pursuant to Article 94(3) EPC Dated Mar. 29, 2010 From the European Patent Office Re. Application No. 08720055.6.
Response Dated Aug. 2, 2010 to Communication Pursuant to Article 94(3) EPC of Mar. 29, 2010 From the European Patent Office Re. Application No. 08720055.6.
Communication Relating to the Results of the Partial International Search Dated Aug. 8, 2008 From the International Searching Authority Re.: Application No. PCT/IL2008/000432.
International Search Report Dated Nov. 19, 2008 From the International Searching Authority Re.: Application No. PCT/IL2008/000432.
Written Opinion Dated Nov. 19, 2008 From the International Searching Authority Re.: Application No. PCT/IL2008/000432.
Nonaka et al. "Ultrasonic Position Measurement and Its Applications to Human Interface", Instrumentation and measurement Technology Conference, 1994, IMTC/94, Conference Proceedings, 10th Anniversary, Advanced Technologies in I & M, IEEE, Hamamatsu, Japan, May 10-12, 1994, XP010121966, P.753-756, May 10, 1994.
Invitation Pursuant to Article 94(3) and Rule 71(1) EPC Dated Feb. 8, 2012 From the European Patent Office Re. Application No. 08720055.6.
Response Dated Dec. 15, 2011 to Communication Pursuant to Article 94(3) EPC of Jun. 17, 2011 From the European Patent Office Re. Application No. 08720055.6.
Examination Report Dated Nov. 23, 2011 From the Intellectual Property Office of New Zealand Re. Application No. 580664.
Examiner's Report Dated Feb. 2, 2012 From the Australian Government, IP Australia Re. Application No. 2008231407.

* cited by examiner

SYSTEM AND METHOD FOR POSITIONING

RELATED APPLICATION/S

This Application is a National Phase of PCT Patent Application No. PCT/IL2008/000432 having International filing date of Mar. 27, 2008, which claims the benefit under 35 U.S.C. §119(e) of U.S. Provisional Application No. 60/907,280 filed on Mar. 27, 2007 which is hereby incorporated by reference as if fully set forth herein.

FIELD OF THE INVENTION

The present invention in some embodiments thereof, relates to positioning systems and methods, and more particularly, but not exclusively to small space positioning systems and methods.

BACKGROUND OF THE INVENTION

The field of small space positioning, positioning within spaces of a few meters or less, is known. Known applications utilizing small space positioning systems include applications with pointing devices for computer interaction, robotics and machine control systems, as well as computer interaction systems for toys and inventory control. Certain applications may require 2D solutions, others may require 3D solutions. Certain applications such as pointing devices may require only one-way communication, whereas others, e.g. robotic applications, may require two-way communication.

Digital writing instruments, e.g. digital pens, are typically used to capture and digitize pen strokes for computer interaction. Known digital pens include ultrasonic based digital pens. Typically, an ultrasonic pulse signal put out by the digital pen is sensed by receivers and distances determined from the outputs of the receivers are triangulated and correlated to absolute pen positions. Typically, the position measurements are based on measuring the Time Of Flight (TOF) of the transmitted pulses through a Line Of Sight (LOS). TOF estimation typically requires accurate synchronization between the transmitter and the receiver to compensate for clock inaccuracy and/or drift.

International Patent Application Publication No. WO2005111653, entitled "Acoustic Robust Synchronization Signaling For Acoustic Positioning System", assigned to Epos Technologies Ltd; Altman Nathan, the contents of which are hereby incorporated by reference, describes positional element and positioning device, wherein the positional element transmits a continuously modulated acoustic waveform and a synchronization signal that is a sequence of at least two synchronization packets, each bearing timing data for the continuously modulated acoustic waveform. Additionally, the synchronization signal uses time hopping to support concurrent positioning of a plurality of positional elements.

International Patent Application Publication No. WO03088136, entitled "Method And System For Obtaining Positioning Data", assigned to Epos Technologies Ltd; Altman Nathan and Eliashiv Oded, the contents of which are hereby incorporated by reference, describes a positional element for attaining a position and including a first emitter for emitting a substantially continuous ultrasonic waveform decodable to fix the position, and a detector arrangement for detecting the waveform in a manner permitting fixing of the position and outputting the waveform for computation, in a manner retentive of the position fixing ability.

SUMMARY OF THE INVENTION

According to an aspect of some embodiments of the present invention there is provided a system and method for small space positioning, such system providing improved accuracy and/or reduced ambiguity over known systems.

An aspect of some embodiments of the present invention is the provision of a system for small space positioning comprising a transmitting device, movable within an approximate range, configured for transmitting a modulated continuous wave, wherein the modulated continuous wave includes a carrier signal and a base-band signal, and a receiving unit configured for receiving signal(s) transmitted by the transmitting device and for determining a position of the transmitting device within the approximate range based analysis of both the carrier signal and the base-band signal received from the transmitting device.

Optionally, the analysis of both the carrier signal and the base-band signal includes phase analysis of the carrier signal.

Optionally, the receiving unit includes a detector, wherein the detector is configured for performing correlation between a modulated continuous wave received by the receiving unit and an expected modulated continuous wave.

Optionally, the modulated continuous wave is pre-determined and the expected modulated continuous wave is a replica of the modulated continuous wave transmitted by the transmitting device.

Optionally, the receiving unit is configured for determining a base-band and carrier signal correlation curves from the correlation between the received modulated continuous wave and the expected modulated continuous wave.

Optionally, the receiving unit is configured for determining at least one peak in the absolute correlation curve and at least one peak in the real correlation curve.

Optionally, the receiving unit includes at least one receiver and the receiving unit is configured for determining a line of sight distance between the transmitting device and the at least one receiver.

Optionally, a peak in the absolute correlation curve substantially aligned with a peak in the real correlation curves corresponds to a most likely line of sight distance between the at least one receiver and the transmitting device.

Optionally, the system comprises an ambiguity resolver configured to select at least one peak from a plurality of peaks in the real correlation curve.

Optionally, the plurality of peaks is obtained from a received signal including several delayed signals whose correlation curves super-impose on each other.

Optionally, the system comprises an ambiguity resolver, wherein the ambiguity resolver is configured to identify a peak from the plurality of peaks that is closest to the peak of the absolute correlation curve or to decide that there is no suitable peak from the plurality of peaks.

Optionally, the ambiguity resolver is configured to identify a peak from the plurality of peaks that is closest to a rising energy in the absolute correlation curve.

Optionally, the ambiguity resolver is configured to identify a peak from the plurality of peaks based history tracking of determined line of sight distances.

Optionally, the ambiguity resolver is configured to identify a peak from the plurality of peaks based on velocity tracking of determined line of sight distances over time.

Optionally, the ambiguity resolver is configured to identify a peak from the plurality of peaks based on acceleration tracking of velocity of line of sight over time.

Optionally, the ambiguity resolver is configured to compare possible line of sight distances calculated from different receivers.

Optionally, the ambiguity resolver is configured to determine a minimum variance or a maximum likelihood of a superimposed wave fitting the received modulated continuous wave.

Optionally, the ambiguity resolver is configured to identify a peak from the plurality of peaks based on a score assigned to at least a portion of the plurality of peaks.

Optionally, the score is based on values of one or more pre-defined parameters calculated by the ambiguity resolver.

Optionally, the receiving unit is configured for deciphering the most likely line of sight distance between the transmitter and the at least one receiver, wherein the signal received by the receiver includes several delayed signals in close range that super-impose on each other due to multi-pathing of the signal transmitted by the transmitting device.

Optionally, the receiving unit is configured for determining the position within accuracy in the order of one tenth of the carrier signal wavelength.

Optionally, a different base-band signal is used for different systems.

Optionally, the receiving unit is configured to store information regarding the base-band signal to be transmitted by the transmitting device.

Optionally, the receiving unit is configured to distinguish between a modulated signal with a carrier frequency transmitted from the transmitting device of the system and other transmitting devices based on the base-band signal.

Optionally, the receiving unit is configured to store at least one calibration parameter configured for adjusting the expected modulated continuous wave based on transfer function of the system.

Optionally, the calibration parameter is selected from the group including: phase response, amplitude response, and group delay.

Optionally, the modulated continuous wave is an acoustic wave.

Optionally, the modulated continuous wave is an ultrasound wave.

Optionally, the modulated continuous wave is an ultrasound wave within the range of 1-18 MHz configured for penetrating through a media other than air.

Optionally, the modulated continuous wave is an RF wave.

Optionally, the frequency of the carrier signal is in the same order of magnitude as that of a base-band signal of the modulated continuous wave.

Optionally, the receiving unit comprises at least two receivers spaced apart and each positioned in pre-defined locations.

Optionally, the system comprises a processing unit configured to determine a position of the transmitting device based on triangulation of line of sight distances between the transmitting device and each of two receivers from the at least two receivers.

Optionally, the transmitting device is further configured for transmitting a synchronization signal and wherein the synchronization signal defines the start of a time of flight delay.

Optionally, the synchronization signal is an IR signal.

Optionally, the synchronization signal is an RF signal.

An aspect of some embodiments of the present invention is the provision of a method for small space positioning comprising transmitting a modulated continuous wave from a transmitting device, wherein the modulated continuous wave includes a carrier signal and a base-band signal, and receiving signals transmitted by the transmitting device with receivers positioned at a predefined distance from each other; and determining a position of the transmitting device within the approximate range based analysis of both the carrier signal and the base-band signal received from the transmitting device, wherein one of the transmitting device and receivers is movable within an approximate range and the other is positioned at a predefined location.

Optionally, the transmitting device is movable within an approximate range and wherein the receivers are positioned at predefined locations.

Optionally, the analysis of both the carrier signal and the base-band signal includes phase analysis of the carrier signal.

Optionally, the method comprises performing correlation between a modulated continuous wave received by the receiving unit and an expected modulated continuous wave.

Optionally, the modulated continuous wave is pre-determined and the expected modulated continuous wave is a replica of the modulated continuous wave transmitted.

Optionally, the method comprises determining an absolute correlation curve and real correlation curve from the correlation between the received modulated continuous wave and the expected modulated continuous wave.

Optionally, the method comprises determining a peak in the absolute correlation curve and a peak in the real correlation curve.

Optionally, the method comprises determining a line of sight distance between the transmitting device and the at least one receiver.

Optionally, a peak in the absolute correlation curve substantially aligned with a peak in the real correlation curves corresponds to a most likely line of sight distance between the at least one receiver and the transmitting device.

Optionally, the method comprises selecting the peak from a plurality of peaks in the real correlation curve.

Optionally, the plurality of peaks is obtained from a received signal including several delayed signals whose correlation curves super-impose on each other.

Optionally, the method comprises identifying a peak from the plurality of peaks that is closest to the peak of the absolute cross-correlation curve.

Optionally, the method comprises identifying a peak from the plurality of peaks that is closest to a rising energy in the absolute correlation curve.

Optionally, the method comprises identifying a peak from the plurality of peaks based history tracking of determined line of sight distances.

Optionally, the method comprises identifying a peak from the plurality of peaks based on velocity tracking of determined line of sight distances over time.

Optionally, the method comprises comparing possible line of sight distances calculated from different receivers.

Optionally, the method comprises determining a minimum variance or a maximum likelihood of a superimposed wave fitting the received modulated continuous wave.

Optionally, the method comprises identifying a peak from the plurality of peaks based on a score assigned to at least a portion of the plurality of peaks.

Optionally, the score is based on calculated values of one or more pre-defined parameters.

Optionally, the method comprises deciphering the most likely line of sight distance between the transmitter and a receiver, wherein the signal received by the receiver includes several delayed signals in close range that super-impose on each other due to multi-pathing of the signal transmitted by the transmitting device.

Optionally, the method comprises determining the position within accuracy in the order of one tenth of a wavelength of the carrier signal.

Optionally, the method comprises distinguishing between signals transmitted from different transmitting devices.

Optionally, the distinguishing is based on comparing an expected base-band signal with a received base-band signal.

Optionally, the method comprises adjusting a template of the expected modulated continuous wave on the fly.

Optionally, the adjusting is based on a quantitative measure for the quality of the modulated continuous wave received.

Optionally, the quantitative measure is a correlation score from the correlation between the modulated continuous wave and the expected modulated continuous wave.

Optionally, the modulated continuous wave is an acoustic wave.

Optionally, the modulated continuous wave is an ultrasound wave.

Optionally, the modulated continuous wave is an ultrasound wave within the range of 1-18 MHz configured for penetrating through a media other than air.

Optionally, the modulated continuous wave is an RF wave.

Optionally, the frequency of the carrier signal is in the same order of magnitude as that of a base-band signal of the modulated continuous wave.

Optionally, the method comprises performing triangulation of line of sight distances between the transmitting device and each of two receivers configured for receiving the signals transmitted from the transmitting device.

Optionally, the method comprises transmitting a synchronization signal, wherein the synchronization signal defines the start of a time of flight delay.

Optionally, the synchronization signal is an IR signal.

Optionally, the synchronization signal is an RF signal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will pertain. In addition, the materials, methods, and examples are illustrative only and are not intended to be necessarily limiting. Implementation of the method and/or system of embodiments of the invention can involve performing or completing selected tasks manually, automatically, or a combination thereof. Moreover, according to actual instrumentation and equipment of embodiments of the method and/or system of the invention, several selected tasks may be implemented by hardware, by software or by firmware or by a combination thereof using an operating system.

For example, hardware for performing selected tasks according to embodiments of the invention may be implemented as a chip or a circuit. As software, selected tasks according to embodiments of the invention may be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art, how embodiments of the invention may be practiced.

In the drawings.

DESCRIPTION OF SOME EXEMPLARY EMBODIMENTS

Figure 1A:
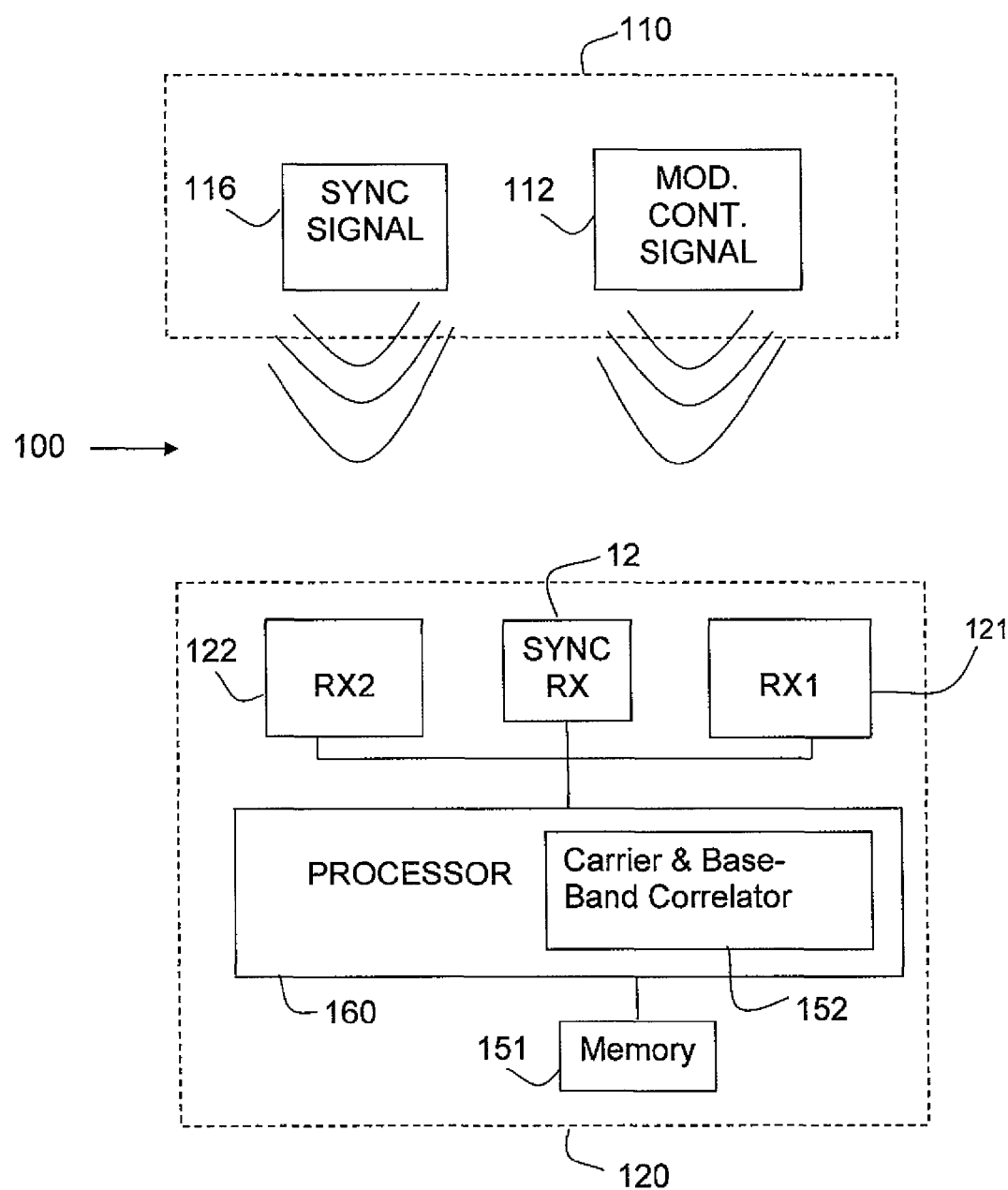
FIG. 1A is a simplified block diagram illustrating a small space positioning system according to some embodiments of the present invention.

The present invention in some embodiments thereof, relates to positioning systems and methods, and more particularly, but not exclusively to small space positioning systems and methods.

According to some embodiments there is provided a system and method for improving accuracy of small space positioning systems. According to some embodiments of the present invention, a small space positioning system transmits a modulated continuous signal to at least two receivers spaced apart. Optionally, a synchronization signal is also transmitted. The modulated continuous signal includes a pre-defined base-band signal embedded on a carrier signal. According to some embodiments of the present invention, TOF and/or LOS distance is determined based on cross-correlation calculated between an expected modulated signal and a received modulated signal. As used herein the term cross-correlation means any comparison function that can compare signals, e.g. minimum variance, minimum absolute error, etc. Optionally, the synchronization signal is transmitted together with the modulated continuous signal to define a start of the TOF delay.

According to embodiments of the present invention, cross-correlation is performed with both the carrier and base-band signal, e.g. without removing and/or performing down conversion, and with or without a low pass filter on the carrier signal. According to some embodiments of the present invention, cross-correlation of the expected and received carrier waveform facilitates performing phase analysis of the carrier signal. According to some embodiments of the present invention, the Base-Band (BB) signal provides positioning with accuracy in the order of magnitude corresponding to a wavelength of the carrier signal while phase analysis of the carrier signal improves the accuracy by providing information regarding the position within that wavelength. According to some embodiments of the present invention, the system and methods described herein facilitate improving the accuracy that may be obtained for acoustic positioning systems. According to some embodiments of the present invention, accuracy in the order of approximately one thousandth of a wavelength of the carrier signal may be achieved. Typically, the accuracy is limited by Signal to Noise Ratio (SNR); with an infinite SNR the accuracy may be infinite too. In practice, SNR may be as high as 20 dB and may still have very good results in terms of accuracy. The inventor found that the limiting factor of the accuracy of the system described herein is not the SNR (if it is high enough, say typically above 15 dB). The limiting factor is the repeatability of the speed of sound which varies slightly even at office/home environments. Small fluctuations in the speed of sound limit the system accuracy.

In some exemplary embodiments, the carrier signal and BB signal are selected so that the carrier signal falls within the frequency range of the BB signal and/or in the same order of magnitude as the BB signal.

In some exemplary embodiment, the carrier and BB signal are acoustic and are in the ultrasound (US) frequency range. In other exemplary embodiments, the carrier and base-band signal are electromagnetic and are in the RF range.

According to some embodiments of the present invention there is provided a system and method for resolving ambiguity—when determining the LOS distance in the presence of multi-path signals. Ambiguity is due to overlapping of correlation curves, e.g. correlation curves of the original signal and the multi-path signals, making it difficult to identify the original LOS peak.

According to embodiments of the present invention, one or more parameters are calculated to determine a most likely positioning during exposure to multi-path signals. In some exemplary embodiments, a scoring system is used to determine the most likely positioning based on a plurality of defined parameters. In some exemplary embodiments, analysis of peaks in an envelope and a real part of the correlation is performed to resolve ambiguity. In some exemplary embodiments, history tracking is performed to resolve ambiguity. In some exemplary embodiments, velocity tracking is performed to resolve ambiguity. In some exemplary embodiments comparison between signals received in each of the receivers is performed to resolve ambiguity.

Reference is now made to FIG. 1A showing a simplified block diagram describing a small space positioning system according to some embodiments of the present invention. According to some embodiments of the present invention, positioning system 100 typically includes a movable and/or mobile transmitting device 110 whose position is to be determined within an approximate range, e.g. within a defined area, and a receiving device 120 for picking up signals transmitted by transmitting device 110 within that defined area and for determining the position of the transmitting device based on a TOF analysis of the received signals. Typically, receiving device 120 is stationary. According to embodiments of the present invention, transmitting device 110 transmits a pre-defined modulated continuous signal 112. One or more receivers, e.g. receiver 121 and receiver 122 from receiving device 120 may pick up signals transmitted by transmitting device 110. The received signals are compared to an expected signal, e.g. a replica of the pre-defined modulated continuous signal that is pre-stored on the receiver end, (or a calculated signal at the receiver end or an acquired signal by the receiver) using a carrier and BB correlator 152. Typically carrier and BB correlator is integral to a processing unit 160. A template, model and/or features of the pre-defined modulated continuous signal are typically pre-stored in memory 151, e.g. non-volatile memory. The template as used herein is the full model of the expected signal from the mathematical series to the digitized input data. In some exemplary embodiments, the reference model, e.g. the template can be used as a "starting point" for a calculated reference. Each system may be a bit different in terms of the transfer function between the transmitter and the receiver. In some exemplary embodiments, the receiver can accommodate for these differences by adjusting the template "on the fly" or in a special calibration mode. A quantitative measure for the quality of the received signal may be implemented for this purpose. In one exemplary embodiment, the quantitative measure is the correlation score. In some exemplary embodiments, a pre-defined threshold on the correlation score is implemented to define the quality of the signal. For example, when the correlation score is above the pre-defined threshold, the received signal may be used by the system to adjust the template.

Optionally, transmitting device 110 also transmits a synchronization signal 116 that may be detected by synchronization receiver 123 and implemented by processing unit 160 to prompt the delay count for determining TOF of the received modulated signal 112. In some exemplary embodiments, synchronization signal 116 may be an IR signal and synchronization receiver 123 may be IR detector. In other exemplary embodiments, an RF signal may be used for synchronization. Typically, the synchronization unit has a substantially zero TOF with respect to the dimensions of positioning system 100. TOF is typically based on the speed of propagation of the modulated signal as well as the distance between transmitting device 110 and receiving device 120.

Receivers 121 and 122 receive a signal and/or a plurality of signals from transmitting device 110. Typically the receiver 121 and 122 are stationary, spaced apart, and positioned at pre-defined locations. In one exemplary embodiment, receivers 121 and 122 are positioned along the edge of a display unit associated with a computing device, e.g. personal computer, mobile phone device, personal digital assistant (PDA). According to some embodiments of the present invention receivers 121 and 122 may be microphones. According to embodiments of the present invention, a carrier and BB correlator 152 in electrical or logical communication with receiver 121 and receiver 122 includes circuitry to cross-correlate the received and expected modulated signal without extracting the BB signal from its carrier and/or together with the carrier signal. Typically a template of the expected modulated signal is implemented for cross-correlation with the received signal.

The received synchronization signal may be utilized to set the start of the delay and also to synchronize clocks between the mobile unit and the base station. A processor 160 determines positioning based on cross-correlation results of the carrier and base-band signal. In some embodiments of the present invention, each receiving unit is associated with a dedicated carrier and BB correlator 152. In alternate embodiments of the present invention, carrier and BB correlator and/or its functionality is integral to a processing unit 160, e.g. in a personal computer or computing device associated with the positioning system. According to some embodiments of the present invention, processor 160 includes Fast Fourier Transform (FFT) capability and is used to perform phase and amplitude analysis of the received signals. According to some embodiments of the present invention memory unit 151 includes memory capability, e.g. memory capability to store information from received signals, parameters of an expected modulated continuous signal and/or other information. Memory unit 151 may include volatile as well as non-volatile memory. In some exemplary embodiments, memory unit 151 stores one or more calibration parameters implemented to adjust the template based on features, e.g. transfer function of the specific hardware sets, e.g. receivers and transmitters. Exemplary calibration parameters may include differences in phase, amplitude, and group delay of the template among other parameters.

According to some embodiments of the present invention, synchronization signal source 116 may be a signal source with a substantially zero TOF and/or Time Of Arrival (TOA) with respect to the dimensions of positioning system 100. For example, the synchronization signal may be an IR signal, an RF signal, and/or a tethered signal. According to some embodiments of the present invention, synchronization signal 116 may be transmitted over an antenna or IR transmitter and modulated continuous signal 112 may be transmitted over another antenna. In some exemplary embodiments, synchronization signal 116 and modulated continuous signal 112 may be transmitted over a single antenna.

According to some embodiments of the present invention, the modulated continuous signal source 112 may be an acoustic signal source, e.g. in the ultrasound range. For example, the signal range of the modulated continuous signal source 116 may vary between around 20 and 80 KHz and/or up to 200 KHz. Although frequencies above 200 KHz may also be used for acoustic signals, the inventors have found that as the frequencies of acoustic signals are increased the susceptibility to loss of LOS. An increase in frequency may have an impact on overall acoustic response due to small artifacts with dimensions bigger or in the vicinity of the wavelength or on the decay rate of the transmitting signal resulting in a smaller effective range of the system.

According to other embodiments of the present invention, signal source 112 may be an RF signal source. In some exemplary embodiments, the RF signal source may emit signals in the Ultra High Frequency (UHF) range, e.g. 433 MHz, 868 MHz, 900 MHz, 915 MHz, and 2.4 GHz and/or in the Ultra-Wideband (UWB) range, e.g. 3.1-10.6 GHz. Distance between the transmitting and receiving device is determined based on the TOF of the modulated continuous signal from the transmitting device to the receiving device on a LOS, e.g. the shortest distance between the transmitting and receiving device. Position of the transmitting device in two dimensions may be determined based on triangulation of the distances determined from each of the two receivers. To determine a position in three dimensions, more than two receivers may be used, e.g. three receivers may be used.

Typically for computer pointing devices and/or for digital pen systems, a transmitting device is embedded, attached or otherwise incorporated into a pointing device and/or pen while at least two receivers are positioned at defined stationary locations for receiving the transmitted signals. Based on the received signal, processor 160 calculates the TOF based on the carrier and BB signal and typically performs triangulation to determine the position of the transmitting device as a function of time.

Figure 1B:
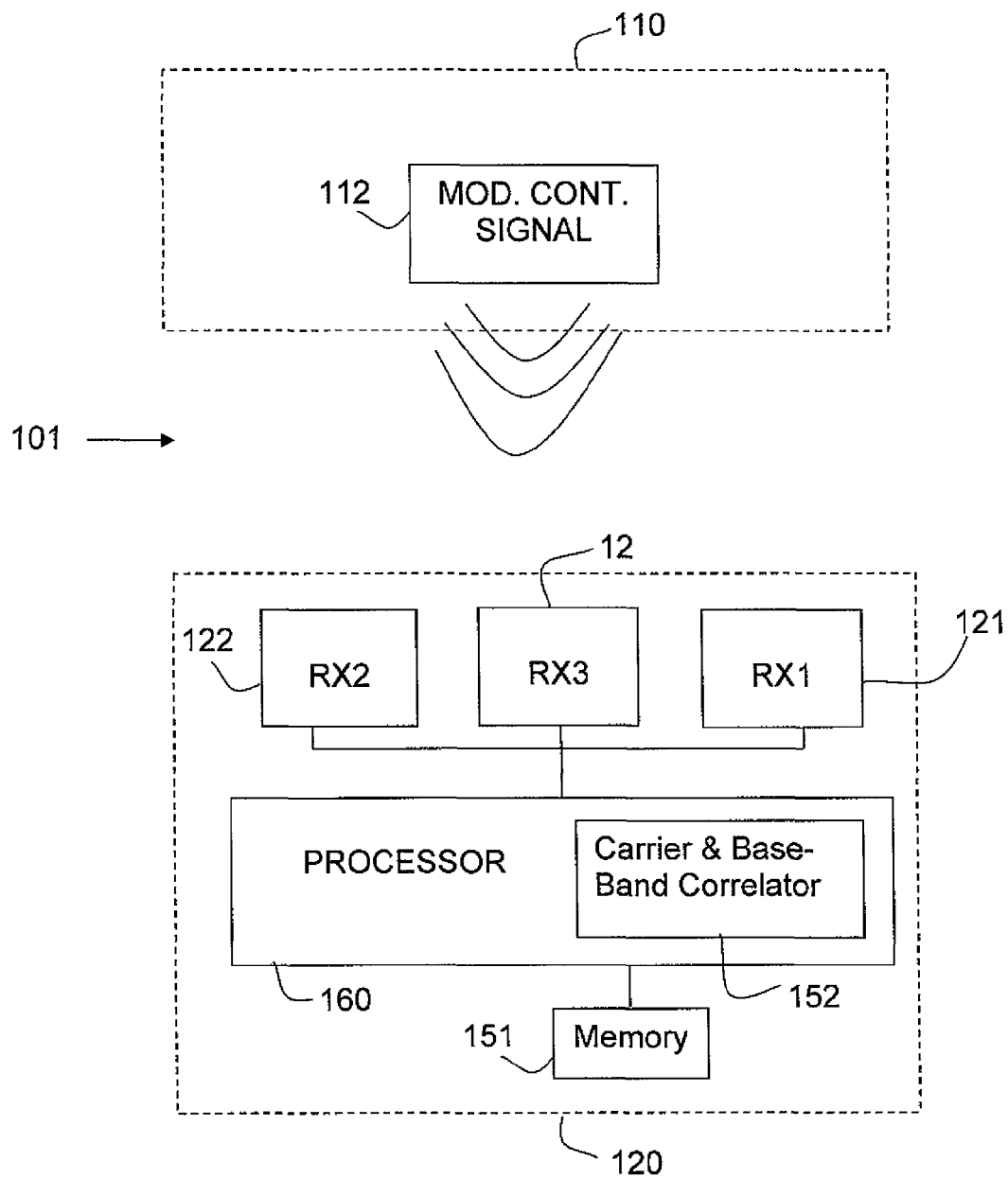
FIG. 1B is a simplified block diagram illustrating a small space positioning system including three receivers according to some embodiments of the present invention.

Reference is now made to FIG. 1B showing a simplified block diagram illustrating a small space positioning system including three receivers according to some embodiments of the present invention. According to some embodiments of the present invention, positioning system 101 includes three receivers 121, 122, and 124 at a defined location and at defined distances between each other. In some exemplary embodiments receivers 121, 122, and 124 are positioned on a single plane, e.g. on three points of a display frame. Alternatively, one of receivers 121, 122, and 124 may be positioned on a different plane. According to some embodiments, implementing three receivers facilitates detecting position without a synchronization signal. In some exemplary embodiments, position is determined by comparing the time delay differences between the three receivers.

In some exemplary embodiments, synchronization signal 116 is embedded in the modulated continuous signal 112, e.g. for RF system and does not require a dedicated antenna.

Figure 2:
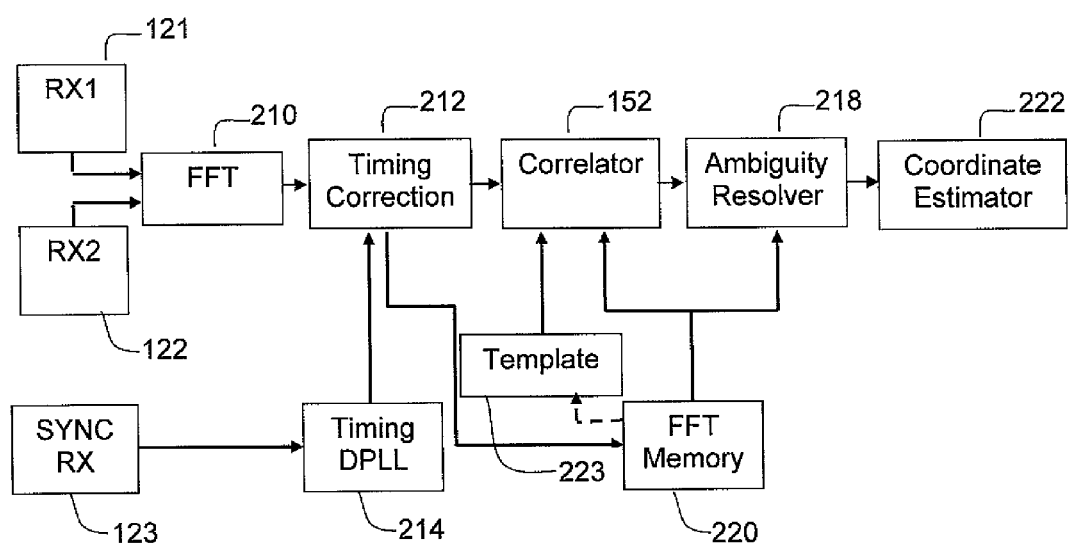
FIG. 2 is a simplified data flow diagram for determining position according to some embodiments of the present invention.

Reference is now made to FIG. 2 showing a simplified data flow diagram for determining position according to some embodiments of the present invention. According to embodiments of the present invention, signals picked up by two or more receivers, e.g. receiver 121 and receiver 122 may undergo FFT 210 so that delay analysis of the received signals may be performed within a pre-defined frequency band. In some exemplary embodiments of the present invention, signals picked up by the receivers may be filtered and amplified prior to performing FFT. Optionally, a synchronization receiver 123, e.g. IR detector, is used to receive a synchronization signal and timing Digital Phase Lock Loop (DPLL) 214 may be implemented to generate a signal that has a fixed relationship to the phase of the received acoustic signals. According to some embodiments of the present invention, timing correction of the signals received from receivers 121 and 121 is performed in the frequency domain based on a detected time shift between the received and the transmitted modulated signal. Typically, the corrected signal is saved in memory 220 for further processing so as to determine positioning. In some exemplary embodiments, memory 220 is integral to memory 151 (FIG. 1). The correlator performs cross-correlation between the template stored in 223 and the input data after the timing correction performed by unit 212. According to some embodiments of the present invention, correlator 240 is implemented for cross-correlating an expected modulated continuous signal, e.g. a pre-determined modulated continuous signal saved in memory 151, (or memory 223 of FIG. 2), with a received modulated continuous signal stored in memory 220. According to some embodiments of the present invention, correlator 216 calculates the envelope and real portion of the correlation curve and based on the position of the envelope peak and the peak of the real portion a TOF may be determined. According to some embodiments of the present invention, ambiguity resolver 218 is implemented to resolve any ambiguity in determining the LOS distance as a result of reception of multi-path signals, e.g. multi-path signals that lead to merging of correlation envelopes. In some embodiments, information stored from previous samples, and/or output signals from the other receiver may be considered when determining TOF and/or distance of LOS. Stored data may include one or more defined parameter values, threshold values and/or other information useful in determining the TOF. According to some embodiments of the present invention, stored data may include tables, e.g. a table of the expected, pre-stored and/or reference signal. Position of origin of the transmitted acoustic signal may be determined by coordinate estimator 222 based on the TOF determined from signals received from receivers 121 and 122. In some exemplary embodiments, position of origin is defined within a pre-defined coordinate system relative to the position of the receivers.

According to some embodiments of the present invention, processor 160 use a template to construct a look up table of reference and/or expected signals against which to compare received signals so that a best match distance may be found. In some embodiments, the expected waveform may be sampled at the Nyquist rate, and any timing mismatch between the sampling points can be overcome by extrapolation functions, to reveal the distance. According to some embodiments of the present invention, the synchronization signal, e.g. an IR signal is used both to set the start of the delay and also to synchronize clocks between the mobile unit and the base station. The skilled person will appreciate that acoustic signals have differing angular transfer functions. According to some embodiments of the present invention, an equalizer may be added to the base station in order to compensate for this phenomenon.

According to embodiments of the present invention, the most likely signal obtained by the ambiguity detector is used to identify a most likely non-zero distance from the template signal. According to some embodiments of the present invention, coordinates estimator 222 may include a maximum likelihood detector similar to that described in incorporated International Patent Application Publication No. WO03088136.

According to some embodiments of the present invention, continuous signal 112 is modulated with a complex low pass time domain signal $s_L(t)$ having a Fourier transform $S_L(\omega)$ so that:

$S_L(\omega)=0$, $|\omega|>B/2$ and $SL(\omega) \neq 0$ otherwise.

The autocorrelation function of this signal in the frequency domain is:

$$C_{LL}(\omega) = S_L(\omega) \cdot \overline{S_L(\omega)} = |S_L(\omega)|^2 \quad \text{Equation (1)}$$

Note that the autocorrelation function $c_{LL}(t)$ in the time domain will be symmetrical (because frequency response is real).

The two-sided band pass signal $S_{BP}(\omega)$ may be synthesized by placing the frequency response of $S_L(\omega)$ around a carrier frequency $\omega_c$ (in positive and negative frequencies): According to embodiments of the present invention, the autocorrelation and/or cross correlation of $S_{BP}(\omega)$ may be represented as (assuming $\omega_c \geq B/2$):

$$C_{BPBP}(\omega) = S_{BP}(\omega) \cdot \overline{S_{BP}(\omega)} = \frac{1}{4} \cdot \begin{bmatrix} |S_L(\omega)|^2 * \delta(\omega - \omega_c) + \\ |S_L(-\omega)|^2 * \delta(\omega + \omega_c) \end{bmatrix} \quad \text{Equation (2)}$$

The time domain representation is:

$$c_{BPBP}(t) = \frac{1}{4} \cdot [c_{LL}(t) \cdot e^{j\omega_c \cdot t} + c_{LL}(-t) \cdot e^{-j\omega_c \cdot t}] \quad \text{Equation (3)}$$
$$= \frac{1}{2} \cdot c_{LL}(t) \cdot \cos(\omega_c \cdot t)$$

Note that if $S_L(\omega)$ is symmetrical, $c_{LL}(t)$ will be real.

In some exemplary embodiments, instead of the two-sided $S_{BP}(\omega)$ signal, one-sided representation, with only positive frequencies containing information, $S_{BP+}(\omega)$.

The autocorrelation of this signal will be:

$$c_{BP+BP+}(t) = \frac{1}{2} \cdot c_{LL}(t) \cdot e^{j\omega_c \cdot t} \quad \text{Equation (4)}$$

The absolute part of $c_{B+PBP+}(t)$ corresponds to the BB signal autocorrelation. The phasor (complex exponent) adds a modulation term on this response.

Figure 3:
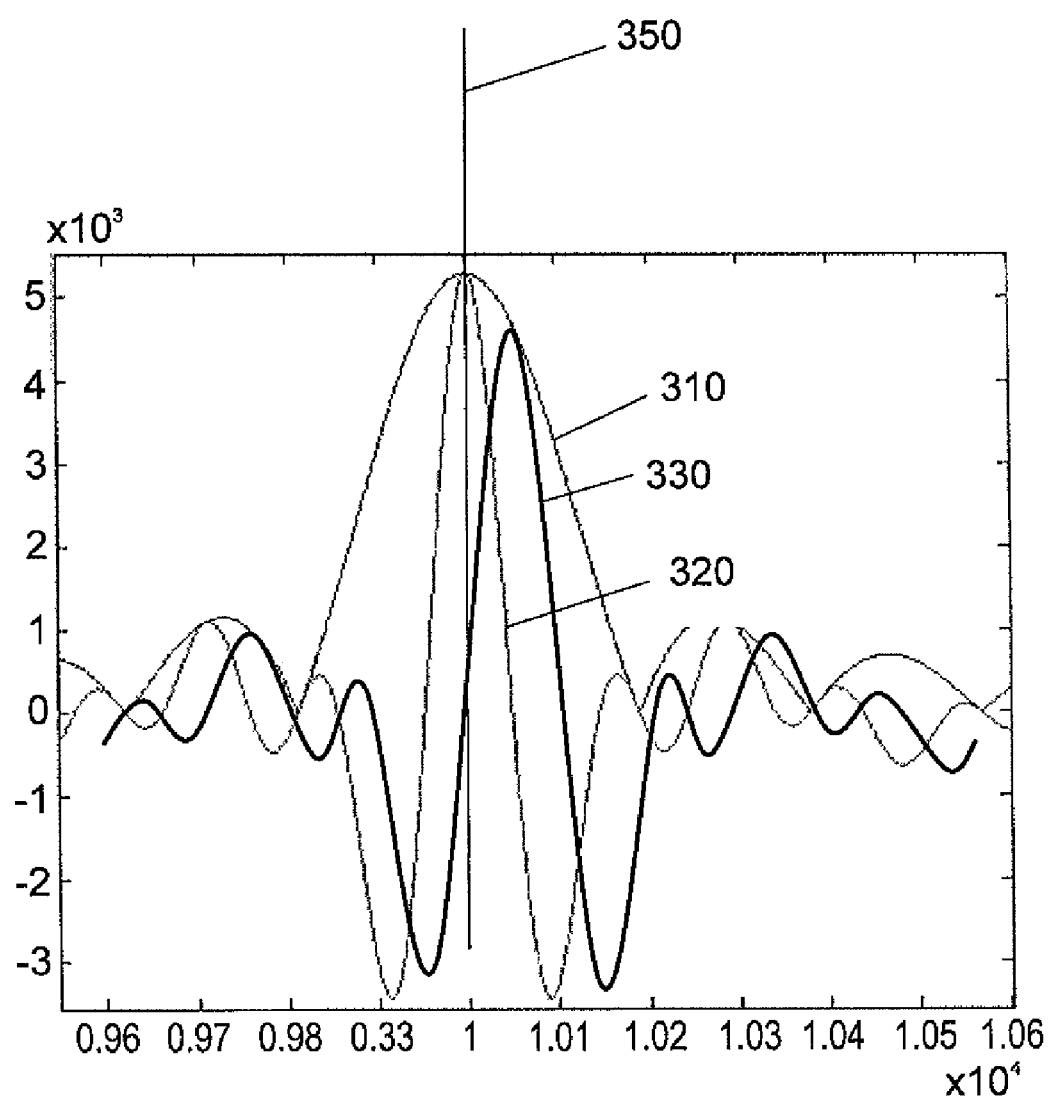
FIG. 3 is a schematic illustration of an absolute, imaginary and real part of the correlation curve of a received and expected signal according to embodiments of the present invention.

Reference is now made to FIG. 3 showing a schematic illustration of an absolute and real part of a cross-correlation curve between a received signal and an expected signal according to embodiments of the present invention. The absolute part of the correlation curve and/or the envelope curve 310 represents the base-band autocorrelation, while the real part of the correlation curve 320 represents the carrier signal cross-correlation. As can be seen from the FIG. 3, the correlation curve for the carrier signal 320 is narrower than the correlation curve corresponding to the base-band signal 310. Correlation curve 320 provides added phase information embedded in the carrier signal. Since the correlation curve for the carrier signal 320 is narrower, it allows more accurate estimation of the distance within the wavelength determined by envelope curve 310. According to embodiments of the present invention, the delay of the LOS signal occurs at time when line 350 crosses the time axis (X axis) and is defined at a time corresponding to a peak in real part of the correlation curve within the confines of the envelope curve 310. In some exemplary embodiments, the imaginary part of the correlation curve 330 may be used to provide the added phase information embedded in the carrier signal. In some exemplary embodiments both the imaginary and real part of the correlation may be implemented to determine phase information.

According to embodiments of the present invention, combining information from the base-band part of the correlation curve with phase information provided by the carrier enables more accurate estimation of the TOA. Typically, e.g. if the bandwidth is sufficient, the base-band signal contains information to the accuracy in the order of magnitude of the wavelength. The carrier signal has a narrower waveband and provides phase information within the wavelength defined by the envelope. The inventors have found that combining the results from the base-band and the carrier enables more accurate estimation of distance without the ambiguity that would result in only using the correlation with the carrier.

According to some embodiments of the present invention, the ideal auto-correlation result of a square BB signal would be envelope 310 that has a shape of a sin c(x), and carrier 320 whose peak is aligned with a peak of the envelope. The sin c(x) represents sin(x)/x. The sin c(x) is due to the finite bandwidth of the signal. The width of the sin c(x) main lobe is proportional to the bandwidth of the signal. According to some embodiments of the present invention, using correlation with the carrier signal may improve the accuracy by a factor of 10.

According to embodiments of the present invention, improved accuracy over other systems is provided by considering the phase information embedded in the carrier signal when determining TOA and/or TOF. In known systems using modulated continuous signals for positioning, e.g. in RF positioning systems, the carrier signal is removed and not considered when determining TOA, TOF and/or LOS distance.

According to embodiments of the present invention, the frequency of the carrier signal, e.g. 30-60 KHz is approximately in the same order of magnitude of the bandwidth, e.g. 50-100 KHz. Since the sampling rate is typically determined based on the bandwidth, e.g. to be at least twice the bandwidth so as to avoid aliasing, the sampling frequency typically used to determine the real signal is also applicable to sample the carrier signal so that the carrier signal information may be considered without significantly increasing the sampling rate of available systems, e.g. acoustic small space positioning systems. Typically, this is not the case for RF systems where the carrier frequency may be in order of magnitude of a hundreds of MHz while the bandwidth may be substantially smaller. However, for known RF systems including receivers with high sampling rates, e.g. sampling rates of 3-4 GHz, and/or even higher rates, e.g. 6-8 GHz, the phase information of the carrier signal may also be applied using the system and methods described herein.

According to some embodiments of the present invention, the carrier signal is typically more robust than the base-band signal and keeps its position with the LOS, e.g. keeps its position with the LOS in the face of multi-path signals. According to some embodiments of the present invention, due to the robust nature of the carrier signal, when determining correlation the susceptibility of the positioning system to ambient noise is reduced as compared to systems that rely on BB signal for determining correlation.

Figure 4A:
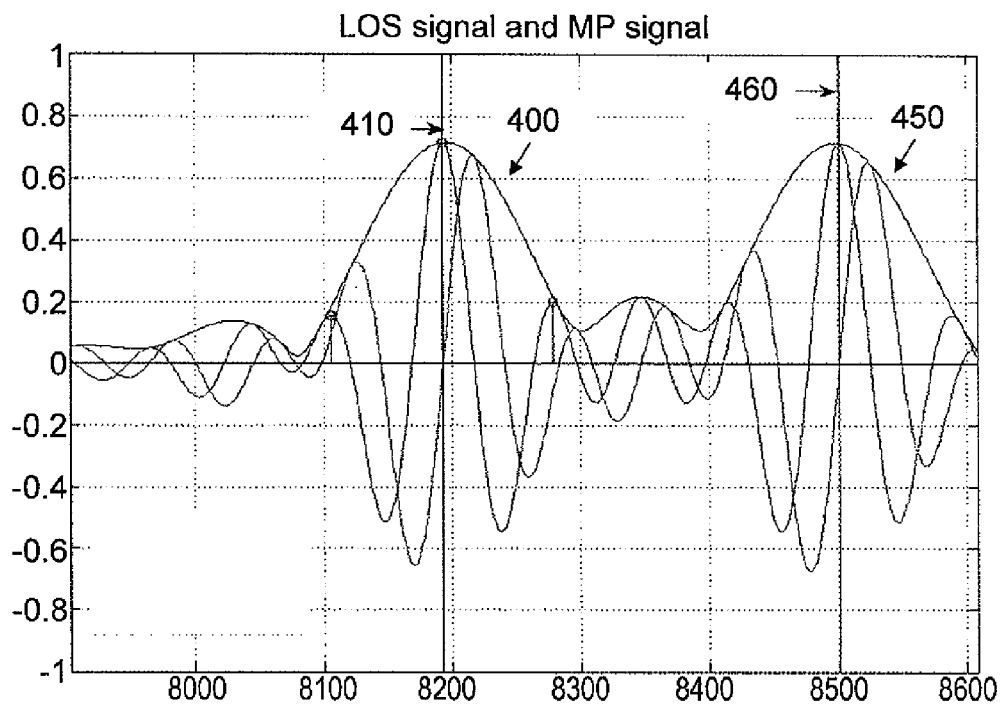
FIGS. 4A-4C are three exemplary sets of correlation curves illustrating potential ambiguity that may arise due the presence multi-path signals according to some embodiments of the present invention.
Figure 4B:
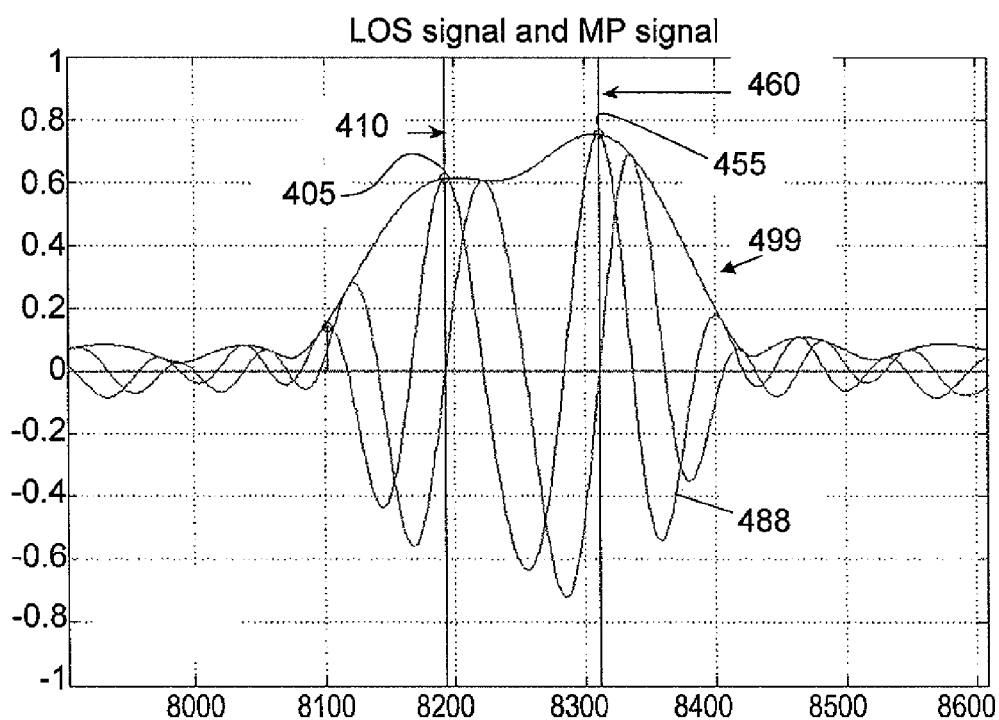
Figure 4C:
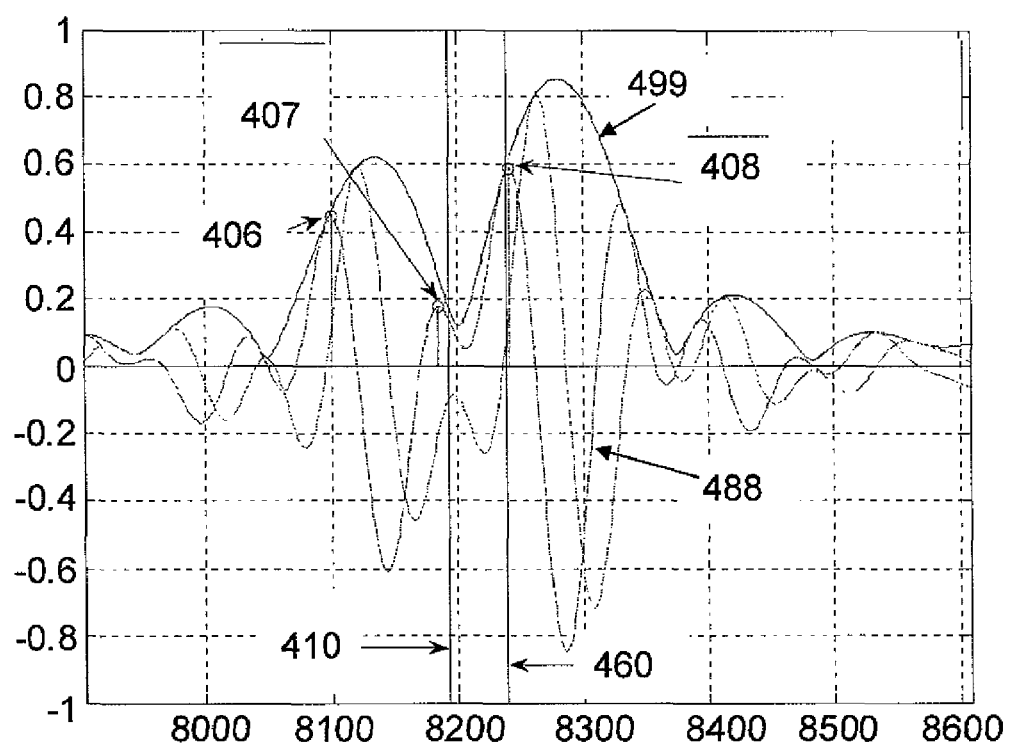

Reference is now made to FIG. 4A-4C showing three exemplary sets of correlation curves illustrating potential ambiguity that may arise due the presence of multi-path signals according to some embodiments of the present invention. According to some embodiments of the present invention, when short range multi-path signals exist, several delayed signals arrive to the detector in close range and super-impose on each other, thereby obscuring the resultant correlation curves. According to embodiments of the present invention, when a multi-path signal exists such that its corresponding correlation curves 450 appears at a distance from the correlation curve of a line of sight (LOS) signal 400, the peak in the real and absolute portion of the correlation, indicating the maximum correlation point 410, may be clear and LOS distance may be determined (FIG. 4A). LOS is the shortest distance from which the signals was received and/or the distance between the transmitter and receiver without multi-pathing. Since, the shortest distance is represented by the first peak with delay 410, it is clear that this first peak represents the LOS signal.

According to embodiments of the present invention, ambiguity may result from short multi-path signals, e.g. multi-path signals from a distance in the order of magnitude of one wavelength of the carrier signal. As the multi-path delay 460 approaches the LOS delay 410 (FIGS. 4B-4C) the shape of the correlation curves may be obscured due to superimposing of the correlation curves of the LOS signal 410 and the multi-path signal 460.

Typically as shown in FIG. 4B, when close multi-pathing occurs, multiple potential LOS peaks, e.g. peaks 405 and 455 may be found in the real portion of the correlation curve leading to ambiguity as to which peak corresponds to the LOS. At first glance, the envelope curve 499 and the real curve 488 seem to point to a maximum correlation at time 460 when real curve 488 has its maximum peak 455 although the LOS peak occurs at delay 410.

In some exemplary embodiments, when an even closer multi-path signal appears (FIG. 4C), the LOS signal and delay may be further obscured and none of the potential peaks in the real correlation curve, e.g. peaks 406, 407, and 408 may correspond to the original LOS peak corresponding to delay 410. Superposition of the signals may lead to amplification of a peak that is not the LOS peak and/or attenuation of a peak that does correspond to the LOS. Faced with ambiguity as to the LOS distance, more than one criterion may need to be examined to determine the most likely LOS peak.

Figure 5:
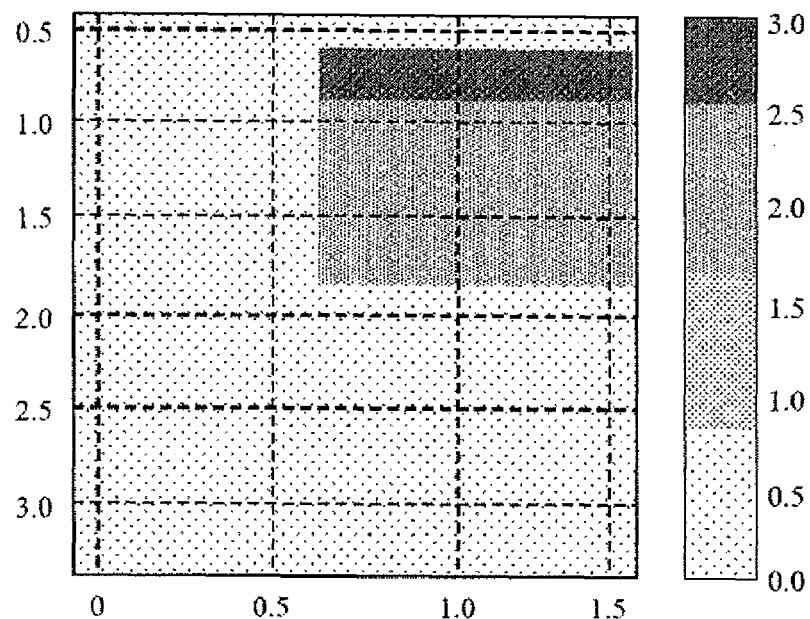
FIG. 5 is an exemplary map showing the relationship between amplitude of a multi-path signal, delay of a multi-path signal and the position of the LOS with respect to strongest peak according to embodiments of the present invention.

Reference is now made to FIG. 5 showing a map depicting a relationship between amplitude of a single multi-path signal, delay of a single multi-path signal and resultant peaks that may be used to identify the line of sight position according to embodiments of the present invention. The plot shows the relative height of the closest LOS real peak compared to its neighboring peaks. In one example, a score of 0 on the legend indicates that the MP amplitude is lower than the LOS and the delay of the MP is large. A score of 3 on the other hand indicates that the MP amplitude is as high as or higher than the LOS amplitude and the delay between the LOS and MP is relatively small. A score of 2 indicates that the highest peak was found to the right of the LOS. The present inventors have found that when the MP amplitude starts to be higher than the LOS, and the MP delay is a bit lower than 1.5 carrier wavelengths, then this peak is lower than its neighbors. These cases are the hardest to resolve. FIG. 4C showed a simulated case corresponding to a MP signal with amplitude of 1.2 and MP delay of 0.486 of the carrier wavelength.

Figure 6:
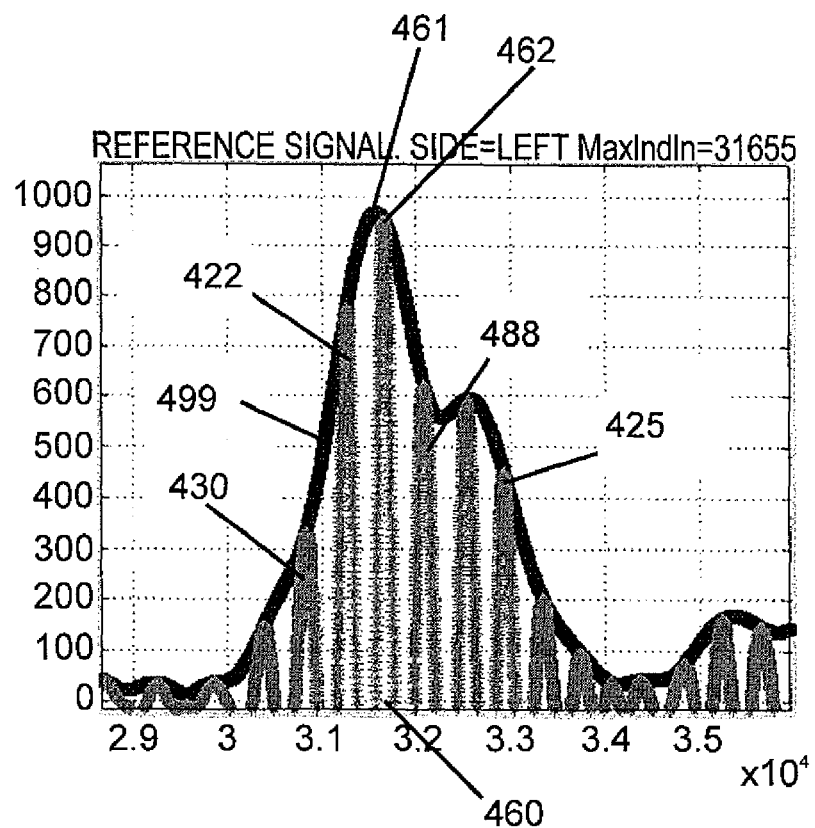
FIG. 6 is a schematic illustration of exemplary absolute and real part of an auto-correlation curve that may be obtained from multiple multi-path signals superimposed on an LOS signal.

According to embodiments of the present invention, ambiguity resolver 218 (FIG. 2) is implemented to resolve ambiguity resulting from super-positioning of multi-path signals. Reference is now made to FIG. 6 showing a schematic illustration of exemplary absolute and real part of an auto-correlation curve that may be obtained from multiple multi-path signals superimposed on an LOS signal. At first glance, the envelope curve 499 and the real curve 488 seem to point to a maximum correlation at time 460 when real curve 488 has its maximum peak 462. According to some embodiments of the present invention, one or more criteria and/or parameters may be considered and/or calculated for deciphering, estimating, and/or choosing a LOS peak, e.g. a peak corresponding to the LOS distance. In some exemplary embodiments, the distance between envelope peak 499 and the carrier peak 462 may be considered. For example, the present inventor has found that it may be expected that the carrier peak closest to the envelope peak is the LOS peak. For example, in FIG. 6, the peak 462 may be considered as a strong candidate for the LOS peak as it is closest to envelope peak 461. Additionally, or alternatively, peaks that are beyond a pre-defined distance from the envelope peak may be dismissed as weak candidates and the LOS peak may be chosen by a process of elimination. For example, peaks 425 and 430 may be dismissed as weak candidates.

Furthermore, the above mentioned distance between the envelope peak and the carrier peak may be just one of a few parameters and/or criteria considered to estimate the most likely LOS peak. One other parameter that may be considered is whether or not the peak is located on a rising or steep rising part of the envelope. The present inventor has found that it may be expected that the LOS peak may be a peak located on the rising energy of the envelope curve, e.g. the first peak on the steepest portion of curve 420 as it is rising. For example, based on this parameter, peak 422 may be determined to be the LOS peak. According to some embodiments of the present invention, positions and/or distances corresponding to the LOS peaks in previous samples may be considered when choosing the most likely LOS peak in a current sample. In some exemplary embodiments, a position and/or distance corresponding to an LOS peak deciphered in previous samples where no ambiguity due to close multi-path existed may be considered and used as a reference point when determining the most likely current LOS peak. For example, if four samples ago, it was clear that the LOS peak corresponded to a distance A from the receiver because there was no multi-path ambiguity in that sample, that sample may be used as a reference point to determine what would be the most likely distance and hence LOS peak for the current sample. History tracking the location of the LOS peak based on previous locations of the LOS peak, e.g. locations with no ambiguity, may improve the likelihood of choosing the correct LOS peak. In some exemplary embodiments, scores may be determined for different possibilities and the possibility with the best metric may be chosen as the most likely LOS peak for the current sample.

According to some embodiments of the present invention, cross-correlation between a previous signal and a current signal may be performed to enable velocity tracking of the distances determined by the LOS peak. According to some embodiments of the present invention, cross correlation between previous signals and current signals may be used to perform velocity tracking Depending on the application implemented, reasonable and/or likely ranges of velocities between sampling points may be pre-determined. Peaks that correspond to unlikely velocities outside a predefined range may be disqualified as likely LOS peaks and/or may result in low scoring. For example, in pen digitizer systems hand motion is typically used to move the transmitting device. Possible ranges of hand motion are known and may be used to exclude unlikely positions and/or changes in position of the LOS over a defined time period. In some exemplary embodiments, LOS peaks may be given scores based on a determined velocity with respect to a previous sample. The LOS peak with the best score, e.g. with the most likely velocity, may be chosen as the most likely LOS peak. Velocity tracking may be performed between two samples, e.g. neighboring samples, and/or between pluralities of samples. In some exemplary embodiments, velocity tracking may be performed with a previous sample having no ambiguity.

According to some embodiments of the present invention, information obtained from another receiver may be used to decipher the most likely LOS peak. In some exemplary embodiments, cross-correlation between input signals received from two receivers, e.g. receivers 121 and 122 (FIG. 1), may be performed to determine a most likely LOS peak. The present inventors have found that ambiguity due to multi-pathing does not typically affect both receivers at the same time and/or in the same manner. In some exemplary embodiments of the present invention, each input signal may be implemented as a template for another receiver and/or received signal. When comparing results from each receiver, additional information is added and ambiguity in position may be eliminated and/or reduced.

Any of the above parameters, as well as others, may be used alone or in combination to determine the most likely LOS peak. In some exemplary embodiments, a scoring system is used based on the different parameter values, so that each parameter contributes a score to each peak, and then the LOS peak is selected as that with the highest (or lowest) score. Weighting may be applied to each of the parameters. For example, important parameters may be given a larger weight as compared to other parameters. In some embodiments, the peak obtaining the highest score may be determined to be the most likely LOS peak. Alternatively, the scoring system is defined such that the peak obtaining the lowest score is selected and used as the most likely LOS peak.

According to some embodiments, other parameters and/or additional parameters may be considered to help decipher the most likely LOS peak.

The present inventors have found that for acoustic positioning there are advantages to using a transmitting signal in the US frequency range. US waves are at the higher end of the acoustic spectrum. Typically, higher accuracies may be obtained for higher frequency carrier signals. Another advantage is that US waves are typically less susceptible to interference from environmental noise since US transmitters are less prominent in our typical environment as compared to other acoustic transmitters and/or compared to RF transmitters. For cases when additional US transmitters and/or US signals may appear in the surrounding environment, they typically decay faster than other acoustic waves since decay rate is increase for higher frequencies. Another advantage of US positioning systems is that for a required amount of transmission energy, US transmitters and/or receivers are typically smaller than other signal transmitters and/or receivers. Additionally, since the US frequency range is not audible to humans, it is more practical for user interaction than other acoustic ranges used in acoustic positioning systems. In some exemplary embodiments, the range of the acoustic frequencies implemented may be limited due to greater susceptibility to temporary loss of LOS for higher range signals.

Although systems and methods have been mostly described for acoustic signals ranging between 20-100 KHz, the system and methods described herein may also be applicable to medical ultrasound systems typically applying higher frequencies, e.g. 1-6 MHz for deep structures such as liver and kidneys or 7-18 MHz for structures such as muscles, tendons, testes, breast and neonatal brain. Additionally, the system and method described herein are also applicable to RF systems.

According to embodiments of the present invention, the system and method described herein may be easily adapted to multi-users, e.g. a plurality of users working in proximity to each other. According to some embodiments of the present invention, each transmitting device 110 may transmit a unique modulated continuous signal that may be recognized by dedicated detectors 151 and 152 (FIG. 1). In some exemplary embodiment, the carrier signal in different transmitting devices may be modulated by a different base-band signal for different users. Each receiver and/or detector may recognize the base-band pattern corresponding to its related transmitter. For example, recognition may be enabled by signal analysis of the base-band signal. Received signals that do not posses defined properties of the expected base-band signal may be ignored and/or excluded from TOF analysis. Since TOF is determined by both the base-band and carrier information, different signals may be implemented without sacrificing the accuracy of the detection and/or estimation of the TOF.

It is expected that during the life of a patent maturing from this application many relevant detecting and processing circuitries will be developed and the scope of the term detector and/or processor is intended to include all such new technologies a priori.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity described in the context of separate embodiments, may also be provided in combination with a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A system for small space positioning comprising: a transmitting device, movable within an approximate range, configured for transmitting a modulated continuous wave, wherein the modulated continuous wave is an ultrasound wave and wherein the modulated continuous wave includes a carrier signal and a base-band signal; and a receiving unit configured for receiving signal(s) transmitted by the transmitting device and for determining a position of the transmitting device within the approximate range based on analysis of both the carrier signal and the base-band signal received from the transmitting device wherein the analysis of the base-band signal provides determining a position with accuracy in the order of magnitude of a wavelength of the carrier signal and analysis of the carrier signal provides improving accuracy of the position within the determined wavelength.

2. The system according to claim 1 wherein the analysis of both the carrier signal and the base-band signal includes phase analysis of the carrier signal.

3. The system according to claim 1 wherein the receiving unit includes a detector, wherein the detector is configured for performing correlation between a modulated continuous wave received by the receiving unit and an expected modulated continuous wave.

4. The system according to claim 3 wherein the modulated continuous wave is pre-determined and the expected modulated continuous wave is a replica of the modulated continuous wave transmitted by the transmitting device.

5. The system according to claim 3 wherein the receiving unit is configured for determining base-band and carrier signal correlation curves from the correlation between the received modulated continuous wave and the expected modulated continuous wave.

6. The system according to claim 5, wherein the correlation curves include absolute and real correlation curves and wherein the receiving unit is configured for determining at least one peak in the absolute correlation curve and at least one peak in the real correlation curve.

7. The system according to claim 6, wherein the receiving unit includes at least one receiver and the receiving unit is configured for determining a line of sight distance between the transmitting device and the at least one receiver.

8. The system according to claim 7 wherein a peak in the absolute correlation curve substantially aligned with a peak in the real correlation curves corresponds to a most likely line of sight distance between the at least one receiver and the transmitting device.

9. The system according to claim 8 comprising an ambiguity resolver configured to select at least one peak from a plurality of peaks in the real correlation curve.

10. The system according to claim 9 wherein the plurality of peaks are obtained from a received signal including several delayed signals whose correlation curves super-impose on each other.

11. The system according to claim 8, comprising an ambiguity resolver, wherein the ambiguity resolver is configured to identify a peak from a plurality of peaks that is closest to the peak of the absolute correlation curve or to decide that there is no suitable peak from the plurality of peaks.

12. The system according to claim 9, wherein the ambiguity resolver is configured to identify a peak from the plurality of peaks that is closest to a rising energy in the absolute correlation curve.

13. The system according to claim 9, wherein the ambiguity resolver is configured to identify a peak from the plurality of peaks based at least one of: history tracking of peaks, velocity tracking of peaks over time, and acceleration tracking of peaks over time.

14. The system according claim 9, wherein the ambiguity resolver is configured to compare possible line of sight distances calculated from different receivers.

15. The system according to claim 9, wherein the ambiguity resolver is configured to determine a minimum variance or a maximum likelihood of a superimposed wave fitting the received modulated continuous wave.

16. The system according to claim 9, wherein the ambiguity resolver is configured to identify a peak from the plurality of peaks based on a score assigned to at least a portion of the plurality of peaks, wherein the score is based on values of one or more pre-defined parameters calculated by the ambiguity resolver.

17. The system according to claim 1, wherein the base-band signal is different from a base-band signal used in another same system.

18. The system according to claim 17 wherein the receiving unit is configured to distinguish between a modulated signal with a carrier frequency transmitted from the transmitting device of the system and other transmitting devices based on the base-band signal.

19. The system according to claim 1, wherein the receiving unit is configured to store at least one calibration parameter configured for adjusting the expected modulated continuous wave based on transfer function of the system.

20. The system according to claim 1, wherein the modulated continuous wave is an acoustic wave.

21. The system according to claim 1, wherein the modulated continuous wave is an ultrasound wave within the range of 20-100 KHz configured for penetrating through a media other than air.

22. The system according to claim 1, wherein the frequency of the carrier signal is in the same order of magnitude as that of a base-band signal of the modulated continuous wave.

23. The system according to claim 1, wherein the transmitting device is further configured for transmitting a synchronization signal and wherein the synchronization signal defines the start of a time of flight delay.

24. A method for small space positioning comprising:
transmitting a modulated continuous wave from a transmitting device, wherein the modulated continuous wave includes a carrier signal and a base-band signal;
wherein the modulated continuous wave is an ultrasound wave and receiving signals transmitted by the transmitting device with receivers positioned at a predefined distance from each other; and
determining a position of the transmitting device within the approximate range based on analysis of both the carrier signal and the base-band signal received from the transmitting device, wherein one of the transmitting device and receivers is movable within an approximate range and the other is positioned at a predefined location and, wherein the analysis of the base-band signal provides determining a position with accuracy in the order of magnitude of a wavelength of the carrier signal and analysis of the carrier signal provides improving accuracy of the position within the determined wavelength.

25. The method according to claim 24 wherein the analysis of both the carrier signal and the base-band signal includes phase analysis of the carrier signal.

26. The method according to claim 24, comprising performing correlation between a modulated continuous wave received by the receiving unit and an expected modulated continuous wave.

27. The method according to claim 26 wherein the modulated continuous wave is pre-determined and the expected modulated continuous wave is a replica of the modulated continuous wave transmitted.

28. The method according to claim 26 comprising determining an absolute correlation curve and real correlation curve from the correlation between the received modulated continuous wave and the expected modulated continuous wave.

29. The method according to claim 28 comprising determining a peak in the absolute correlation curve and a peak in the real correlation curve.

30. The method according to claim 24 comprising determining a line of sight distance between the transmitting device and at least one of the receivers.

31. The method according to claim 26, comprising determining an absolute correlation curve and a real correlation curve from the correlation, wherein a peak in the absolute correlation curve substantially aligned with a peak in the real correlation curve corresponds to a most likely line of sight distance between at least one of the receivers and the transmitting device.

32. The method according to claim 31 comprising selecting the peak from a plurality of peaks in the real correlation curve.

33. The method according to claim 32, wherein the plurality of peaks are obtained from a received signal including several delayed signals whose correlation curves super-impose on each other.

34. The method according to claim 32 comprising identifying a peak from the plurality of peaks that is closest to the peak of the absolute cross-correlation curve.

35. The method according to claim 32 comprising identifying a peak from the plurality of peaks that is closest to a rising energy in the absolute correlation curve.

36. The method according to claim 32 comprising identifying a peak from the plurality of peaks based on at least one of history tracking of determined line of sight distances, velocity tracking of peaks over time, and acceleration tracking of peaks over time.

37. The method according to claim 32 comprising comparing possible line of sight distances calculated from different receivers.

38. The method according to claim 32 comprising determining a minimum variance or a maximum likelihood of a superimposed wave fitting the received modulated continuous wave.

39. The method according to claim 32 comprising identifying a peak from the plurality of peaks based on a score assigned to at least a portion of the plurality of peaks.

40. The method according to claim 39 wherein the score is based on calculated values of one or more pre-defined parameters.

41. The method according to claim 24 and comprising distinguishing between signals transmitted from different transmitting devices, wherein the distinguishing is based on comparing an expected base-band signal with a received base-band signal.

42. The method according to claim 26 comprising adjusting a template of the expected modulated continuous wave on the fly.

43. The method according to claim 24 wherein the modulated continuous wave is an acoustic wave.

44. The method according to claim 24, wherein the modulated continuous wave is an ultrasound wave within the range of 20-100 KHz.

45. The method according to claim 24 wherein the frequency of the carrier signal is in the same order of magnitude as that of a base-band signal of the modulated continuous wave.

46. The method according to claim 24 comprising transmitting a synchronization signal, wherein the synchronization signal defines the start of a time of flight delay.

47. The method according to claim 28 wherein the expected signal includes a super-imposed multi-path signal with at least one known characteristic, wherein the at least one known characteristic is selected from a group including: multi-path signal delay and multi-path signal amplitude.

* * * * *